(12) United States Patent
Adam et al.

(10) Patent No.: US 7,022,177 B2
(45) Date of Patent: Apr. 4, 2006

(54) LACTAM-BASED PIGMENTS AND THE USE THEREOF IN THE PRODUCTION OF COLORED PLASTICS OR POLYMERIC COLOR PARTICLES

(75) Inventors: Jean-Marie Adam, Rosenau (FR); Jean-Pierre Bacher, Buschwiller (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/502,707

(22) PCT Filed: Feb. 13, 2003

(86) PCT No.: PCT/EP03/01426

§ 371 (c)(1), (2), (4) Date: Jul. 26, 2004

(87) PCT Pub. No.: WO03/070830

PCT Pub. Date: Aug. 28, 2003

(65) Prior Publication Data

US 2005/0056188 A1    Mar. 17, 2005

(30) Foreign Application Priority Data

Feb. 21, 2002    (CH) .............................. 2002 0297/02

(51) Int. Cl.
C09B 23/00 (2006.01)
C09B 23/10 (2006.01)
C08K 5/34 (2006.01)
C08K 5/35 (2006.01)

(52) U.S. Cl. .................. 106/498; 106/493; 524/87; 524/104; 524/105; 524/106

(58) Field of Classification Search ............... 106/493, 106/498; 524/87, 104, 105, 106
See application file for complete search history.

(56) References Cited

U.S. PATENT DOCUMENTS 4,129,455 A    12/1978 Thompson et al. ......... 106/308
4,198,516 A *   4/1980 Merlo et al. ............. 548/305.1
5,626,633 A     5/1997 Roschger ....................... 8/506

FOREIGN PATENT DOCUMENTS

CA        1323629        10/1993

* cited by examiner

Primary Examiner—Anthony J. Green
(74) Attorney, Agent, or Firm—Joseph C. Suhadolnik

(57) ABSTRACT

The present invention relates to novel pigments of formula

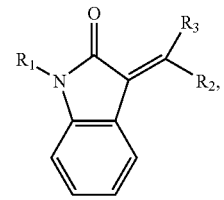
(1)

(1), wherein $R_1$ is hydrogen or $C_1$–$C_{12}$alkyl, $R_2$ is hydrogen, —CN, —COO-aryl, —COO-heteroaryl, —CONH-aryl or —CONH-heteroaryl, and $R_3$ is the radical of a heteroaromatic compound of formula

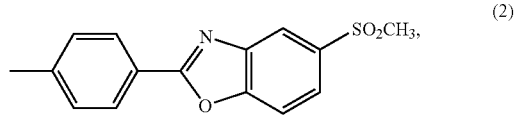
(2)

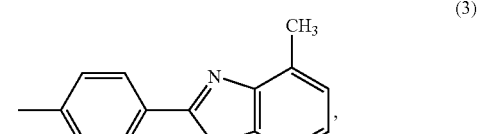

(3)

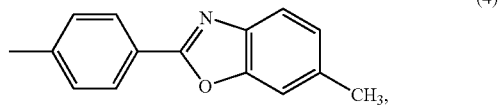

(4)

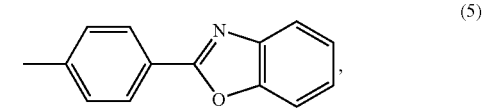

(5)

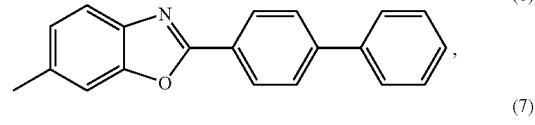

(6)

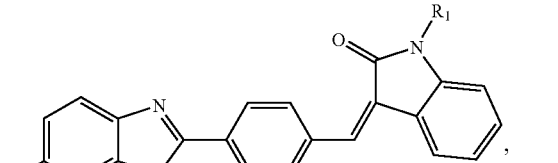

(7)

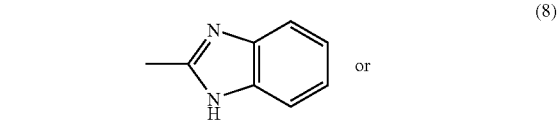

(8) or

-continued
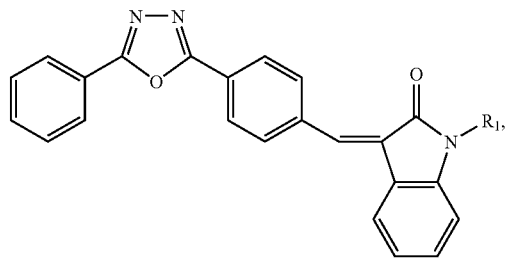
(9)
or $R_2$ and $R_3$ together form a radical of formula
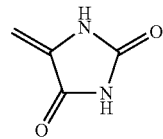
(10)
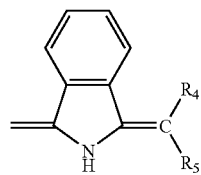
(11)
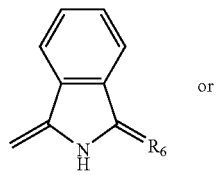
or
(12)
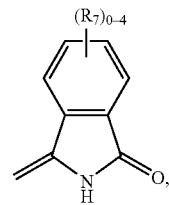
(13)
wherein $R_4$, $R_5$, $R_6$ and $R_7$ are defined herein and to a process for the preparation of those pigments, and to their use in the production of coloured plastics or polymeric colour particles.
6 Claims, No Drawings

LACTAM-BASED PIGMENTS AND THE USE THEREOF IN THE PRODUCTION OF COLORED PLASTICS OR POLYMERIC COLOR PARTICLES

The present invention relates to novel lactam-based pigments, to a process for the preparation of those pigments, and to their use in the production of coloured plastics or polymeric colour particles.

Methods for colouring synthetic materials, such as plastics and polymeric colour particles, in the mass, using pigments, are known. It has been found, however, that the pigments used in such a method do not always fully meet the highest demands, especially with respect to fastness to light, thermal stability and/or tinctorial strength; nor do they completely cover the entire palette of shades desired. There is accordingly a need for new pigments that yield light-fast, thermally stable and tinctorially strong colorations, especially in the yellow to red colour range, and that exhibit good general fastness properties.

It has now been found, surprisingly, that the pigments according to the invention substantially meet the above criteria.

The present invention accordingly relates to pigments of formula

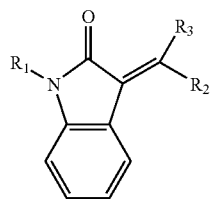

(1)

wherein $R_1$ is hydrogen or $C_1$–$C_{12}$alkyl, $R_2$ is hydrogen, —CN, —COO-aryl, —COO-heteroaryl, —CONH-aryl or —CONH-heteroaryl, and $R_3$ is the radical of a heteroaromatic compound of formula

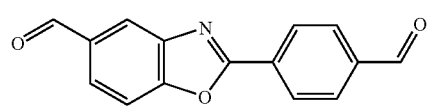

or $R_2$ and $R_3$ together form a radical of formula

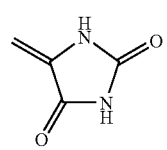

(10)

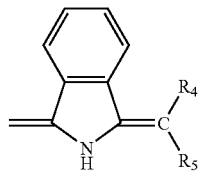

(11)

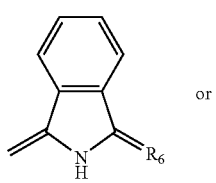

(12)

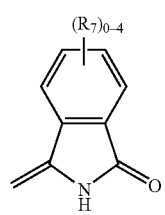

(13)

wherein $R_4$ and $R_5$ are each independently of the other —CN, —COO-aryl, —COO-heteroaryl, —CONH-aryl or —CONH-heteroaryl, $R_6$ is a radical of formula

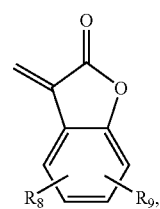

(14)

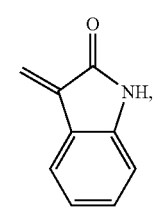

(15)

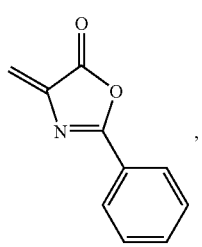

(16)

-continued (17)

(18)

(19)

(20)

(21)

R<sub>7</sub> is halogen, and

R$_8$ and R$_9$ are each independently of the other C$_1$–C$_4$alkyl.

R$_1$ as C$_1$–C$_{12}$alkyl is, for example, methyl, ethyl, propyl, isopropyl, n-butyl, isobutyl, sec-butyl, tert-butyl, pentyl, hexyl, heptyl, octyl, nonyl, decyl, undecyl or dodecyl.

Aryl in —COO-aryl and —CONH-aryl in R$_2$, R$_4$ and R$_5$ is each independently of any other, for example, phenyl which is unsubstituted or substituted by methyl or by halogen, especially by chlorine.

Heteroaryl in —CONH-heteroaryl and —COO-heteroaryl in R$_2$, R$_4$ and R$_5$ is each independently of any other, for example, pyrrole, furan, thiophene, pyridine, imidazole, thiazole, piperazine or pyrimidine.

Preferably, R$_1$ is hydrogen or C$_1$–C$_6$alkyl.

Special preference is given to R$_1$ being hydrogen.

Preferably, R$_2$ is hydrogen or —CN.

Special preference is given to R$_2$ being hydrogen.

Preferably, R$_4$ is hydrogen or —CN.

Special preference is given to R$_4$ being hydrogen.

Preferably, R$_5$ is hydrogen or —CN.

Special preference is given to R$_5$ being hydrogen.

R$_7$ is preferably chlorine.

R$_8$ and R$_9$ as C$_1$–C$_4$alkyl are each independently of the other methyl, ethyl, propyl, isopropyl, n-butyl, isobutyl, sec-butyl or, especially, tert-butyl.

The present invention relates also to the preparation of pigments of formula (1).

Preparation of pigments of formula (1) according to the invention is carried out, for example, by reacting a compound of formula (50)

with a compound of formula (51)

wherein
X is =NH or =O, to form a compound of formula (52)

and optionally, when X is =NH, further reacting the compound of formula (52) with an active-methylene compound, for example of formula R$_4$—CH$_2$—R$_5$.

The present invention relates also to a method of producing coloured plastics or polymeric colour particles, which comprises mixing a high molecular weight organic material and a tinctorially effective amount of at least one pigment of formula (1) with one another.

The colouring of high molecular weight organic substances with the pigment of formula (1) is carried out, for example, by admixing such a pigment with the substrates using roll mills or mixing or grinding apparatuses, as a result of which the pigment is dissolved or finely dispersed in the high molecular weight material. The high molecular weight organic material together with the admixed pigment is then processed using methods known per se such as, for example, calendering, compression moulding, extrusion, coating, spinning, pouring or injection moulding, as a result of which the coloured material obtains its final form. Admixture of the pigment can also be effected immediately prior to the actual processing step, for example by continuously and simultaneously feeding a solid pigment, for example in powder form, and a granulated or pulverulent, high molecular weight organic material and, optionally, also additional ingredients, such as, for example, additives, directly into the intake zone of an extruder wherein mixing occurs just before processing. Generally, however, it is preferable to mix the pigment Into the high molecular weight organic material beforehand, since more uniformly coloured products can be obtained.

In order to produce non-rigid shaped articles or to reduce their brittleness, it is frequently desirable to add so-called plasticisers to the high molecular weight compounds prior to shaping. There may be used as plasticisers, for example, esters of phosphoric acid, phthalic acid or sebacic acid. In the method according to the invention, the plasticisers can be incorporated into the polymers before or after incorporation of the colorant. It is furthermore possible, in order to achieve different colour shades, also to add to the high molecular weight organic substances, in addition to the pigment of formula (1), further pigments or other colorants in any amounts, optionally together with further additives such as, for example, fillers or siccatives.

Preference is given to the colouring of thermoplastic plastics, especially in the form of fibres. Preferred high molecular weight organic materials that can be coloured in accordance with the invention are very generally polymers having a dielectric constant $\geq 2.5$, especially polyester, polycarbonate (PC), polystyrene (PS), polymethyl methacrylate (PMMA), polyamide, polyethylene, polypropylene, styrene/acrylonitrile (SAN) and acrylonitrile/butadiene/styrene (ABS). Especially preferred are polyester and polyamide. More especially preferred are linear aromatic polyesters, which can be obtained by polycondensation of terephthalic acid and glycols, especially ethylene glycol, or condensation products of terephthalic acid and 1,4-bis(hydroxymethyl)cyclohexane, such as, for example, polyethylene terephthalate (PET) or polybutylene terephthalate (PBTP), and also polycarbonates, for example those obtained from α,α-dimethyl-4,4-dihydroxy-diphenylmethane and phosgene, or polymers based on polyvinyl chloride and on polyamide such as, for example, polyamide 6 or polyamide 6.6.

The pigments according to the invention impart tinctorially strong shades to the above-mentioned materials, especially the polyester and polyamide materials, with very good in-use fastness properties, these especially being good light-fastness and good thermal stability.

The Examples that follow serve to illustrate the invention. Unless otherwise specified, parts therein are parts by weight and percentages are percentages by weight. The temperatures are given in degrees Celsius. The relationship between parts by weight and parts by volume is the same as that between grams and cubic centimetres.

EXAMPLE 1

10.2 parts of 2-indolinone are heated to 90° together with 14.3 parts of 3-iminoisoindolinone hydrochloride and 7.7 parts of potassium acetate in 100 parts of dioxane and 20 parts of glacial acetic acid and stirred at 90° for a further 4 hours. The reaction product that precipitates out is filtered off with suction and is washed with a 5:1 mixture of dioxane and glacial acetic acid and then water. After drying, 14.1 parts of the pigment of formula

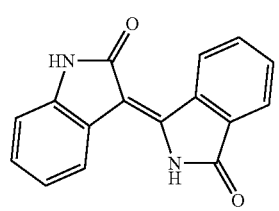

(100)

are obtained, which colours polyester in the mass in yellow shades, with very good thermal stability and light-fastness.

EXAMPLE 2

4.4 parts of 2-cyanobenzamide are heated to 175° together with 4.1 parts of 2-indolinone in 25 parts of o-dichlorobenzene and stirred at that temperature for a further 6 hours. After cooling, 4.4 parts of the pigment of formula (100) precipitate out.

EXAMPLE 3

13.3 parts of 2-indolinone are dissolved in 300 parts of N,N-dimethylacetamide at room temperature and the resulting solution is added to a solution of 14.5 parts of diiminoisoindoline in 150 parts of N,N-dimethylacetamide at room temperature. On being left to stand for 48 hours and dilution with water, 25 parts of the pigment of formula

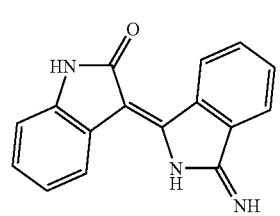

(101)

precipitate out.

1 part of the resulting product is stirred under reflux in 50 parts of 85% acetic acid for 4 hours. After cooling, filtration and drying, 0.5 part of the pigment of formula (100) is isolated.

EXAMPLE 4

2.6 parts of the pigment of formula (101) prepared in Example 3 are stirred in a mixture of 70 parts of 98% acetic acid and 10 parts of dimethylacetamide. After addition of 2 parts of dimedone, the reaction mixture is heated to 80° and is stirred at that temperature for a further 12 hours. After dilution with methanol, 2.7 parts of the pigment of formula

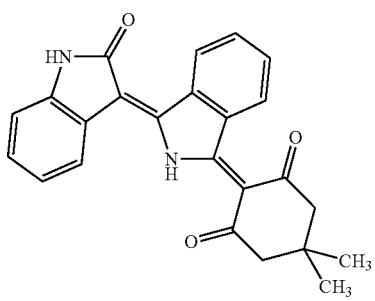

(102)

precipitate out, which colours polyester in the mass in red shades.

EXAMPLES 5–11

By replacing the 2.7 parts of dimedone in Example 4 with an equivalent amount of the active-methylene compound indicated in column 2 of Table 1 and proceeding as indicated in Example 4, pigments having the shades indicated in column 4 are likewise obtained.

TABLE 1
| Ex. | active-methylene compound | pigment of formula | shade |
|---|---|---|---|
| 5 | 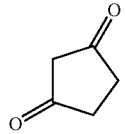 | 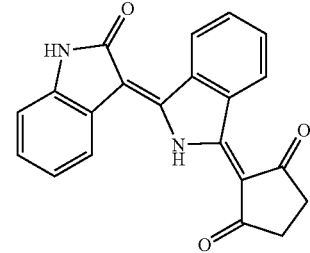 | red |
| 6 | 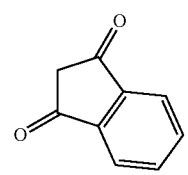 | 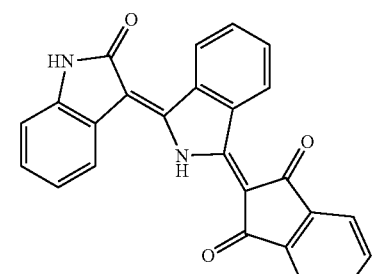 | red |
| 7 | 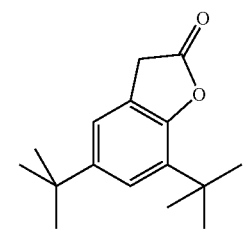 | 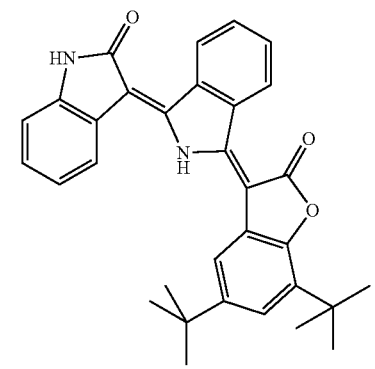 | dark-red |
| 8 | 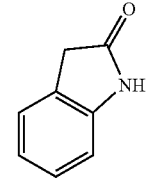 | 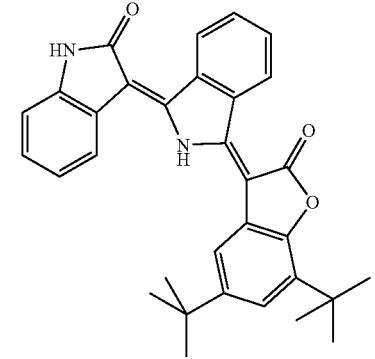 | claret |

TABLE 1-continued

| Ex. | active-methylene compound | pigment of formula | shade |
|---|---|---|---|
| 9 | 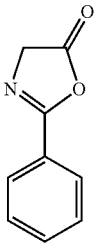 | 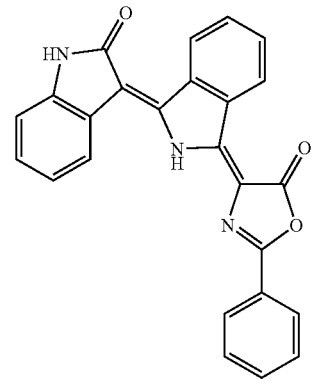 | claret |
| 10 | 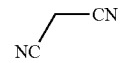 | 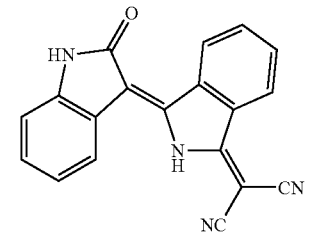 | scarlet |
| 11 | 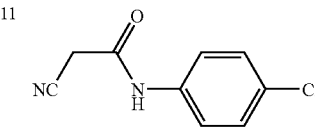 | 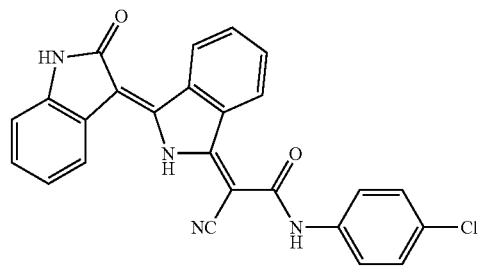 | scarlet |

EXAMPLES 12–21

By replacing the 14.3 parts of 3-iminoisoindolinone in Example 1 with an equivalent amount of the carbonyl or aldehyde compound indicated in column 2 of Table 2 and proceeding as indicated in Example 1, pigments having the shades indicated in column 4 are likewise obtained.

TABLE 2

| Ex. | carbonyl/aldehyde compound | pigment | shade |
|---|---|---|---|
| 12 | 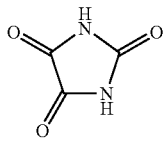 | 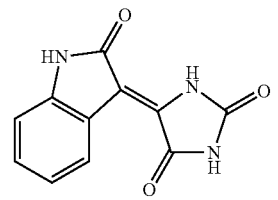 | yellow |

TABLE 2-continued
| Ex. | carbonyl/aldehyde compound | pigment | shade |
|---|---|---|---|
| 13 | 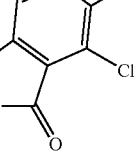 | 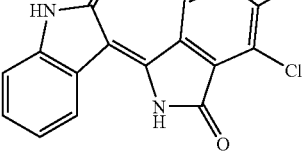 | yellow |
| 14 | 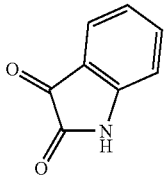 | 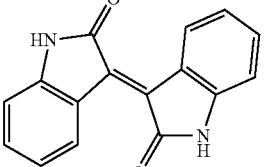 | orange |
| 15 | 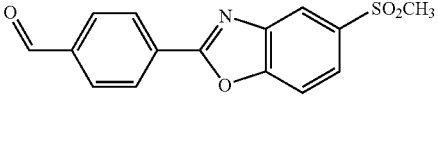 | 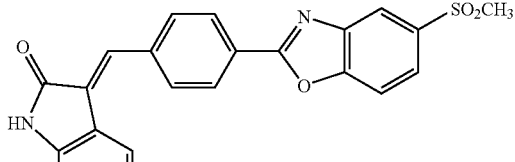 | yellow |
| 16 | 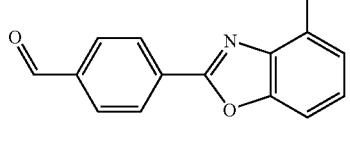 | 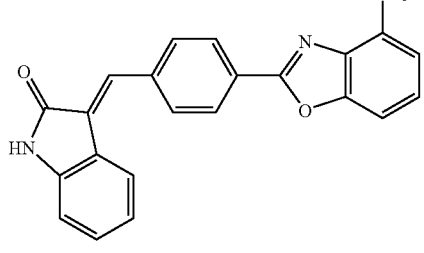 | yellow |
| 17 | 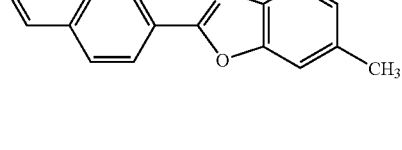 | 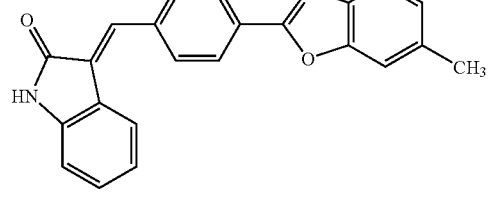 | yellow |
| 18 | 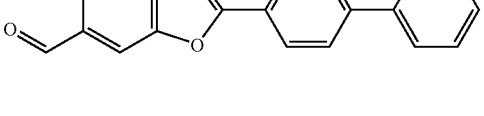 | 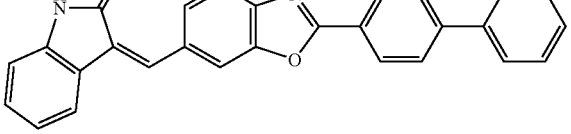 | yellow |

TABLE 2-continued

| Ex. | carbonyl/aldehyde compound | pigment | shade |
|---|---|---|---|
| 19 | | | yellow |
| 20 | | | yellow |
| 21 | | | yellow |

EXAMPLE 22

5.2 parts of the pigment of formula (102) from Example 4 and 1 part of 1,4-phenylene-diamine are stirred under reflux in a mixture of 500 parts of ethanol and 50 parts of acetic acid for 24 hours. The precipitate is filtered off with suction and purified using a 1:1 mixture of dimethylformamide and acetone. 3.8 parts of the pigment of formula:

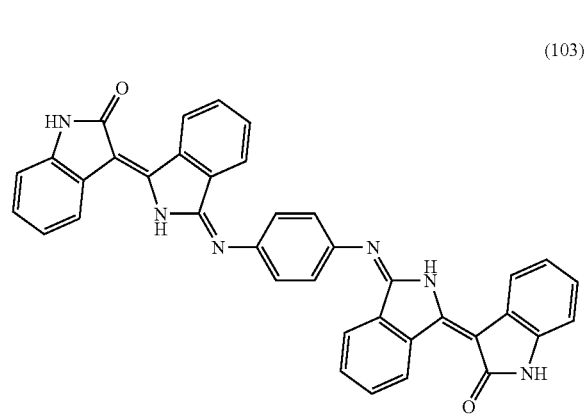

(103)

are obtained, which colours polyester in the mass in dark-red shades.

COLOURING EXAMPLE 1200 parts of polyester granules (PET Arnite D04-300, DSM) are dried at 130° C. for 4 hours and then mixed with 0.24 part of the pigment of formula

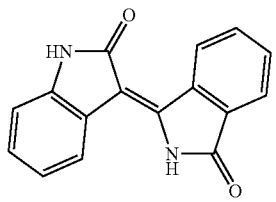

(100)

in a "roller rack" mixing apparatus at 60 revolutions per minute for 15 minutes, until homogeneous.

The homogeneous mixture is extruded in an extruder (twin screw 25 mm, from the company Collin, D-85560 Ebersberg) having 6 heating zones, at a maximum temperature of 275° C., cooled with water, granulated in a granulator (Turb Etuve TE 25 from the company MAPAG AG, CH-3001 Bern) and then dried at 130° for 4 hours, resulting in yellow-coloured polyester granules having good all-round fastness properties, especially having very good light and high-temperature-light fastness properties.

What is claimed is:
1. A pigment of formula
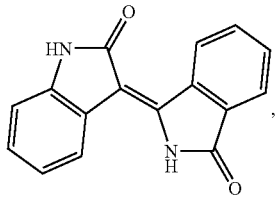
(100)
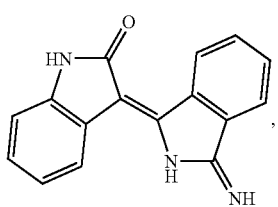
(101)
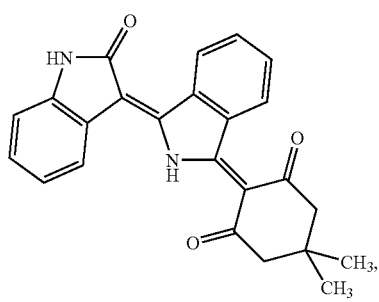
(102)
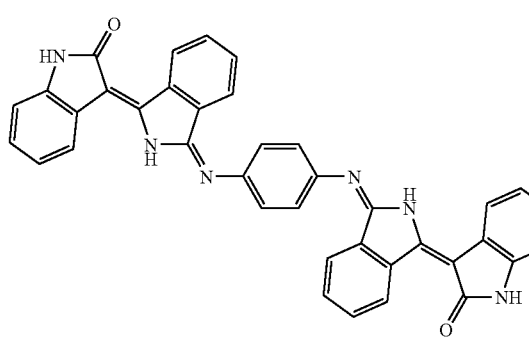
(103)
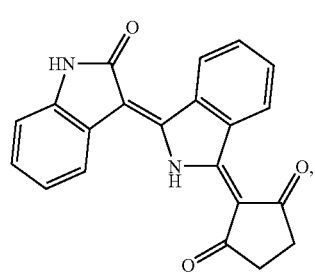
(104)
-continued
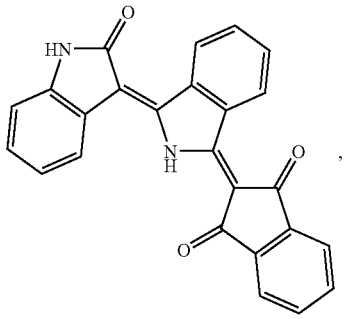
(105)
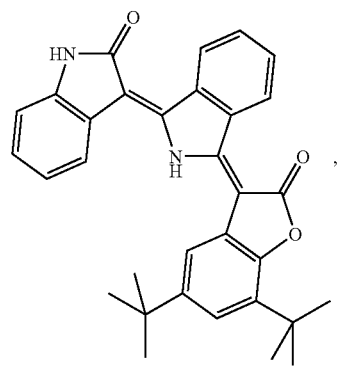
(106)
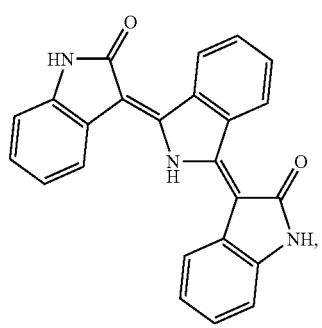
(107)
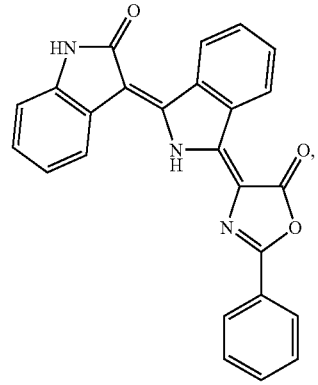
(108)

-continued (109)

(110)

(111)

(112)

(113)

(114)

(115)

(116)

(117)

(118)

(119)

(120)

2. A pigment according to claim 1 of formula
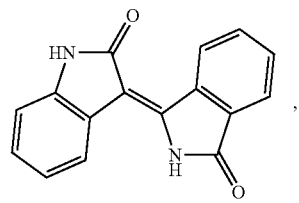 (100)
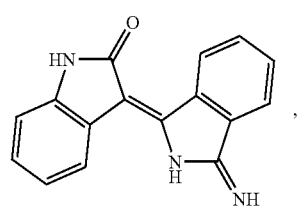 (101)
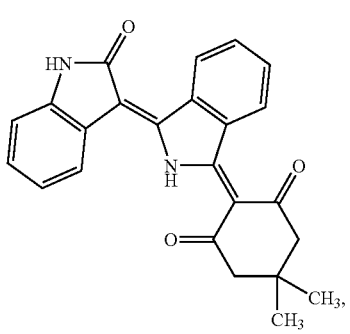 (102)
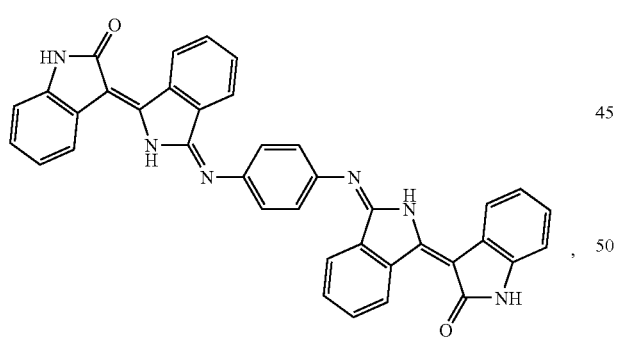 (103)
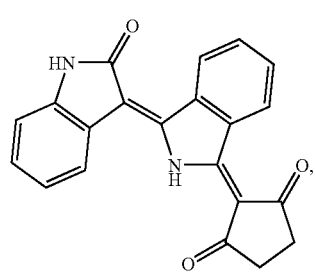 (104)
-continued
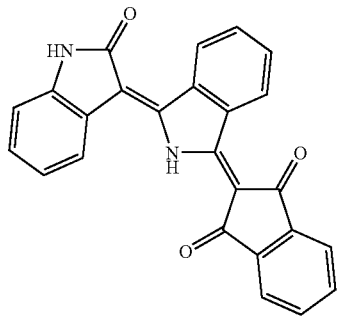 (105)
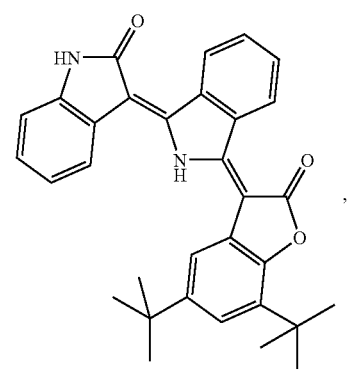 (106)
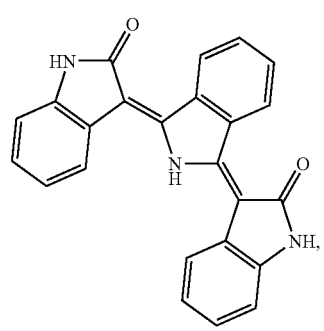 (107)
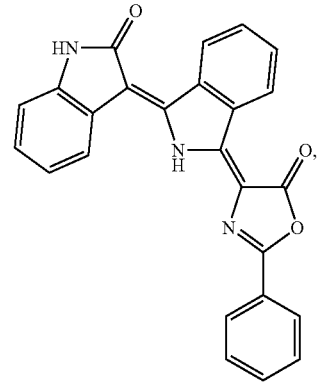 (108)

-continued

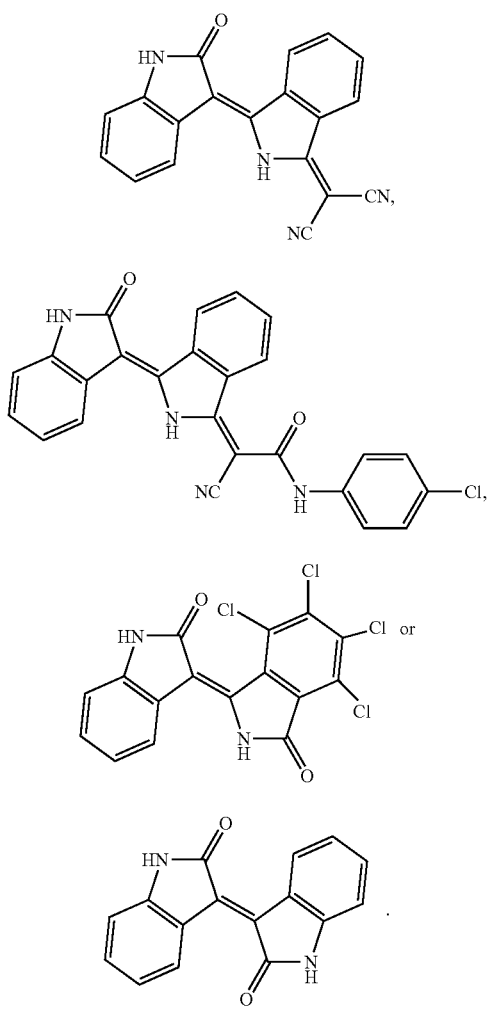

3. A process for the preparation of a pigment of formula (100) (101), (102) or a pigment of formula (104) to (110), according to claim 2, which comprises reacting a compound of formula

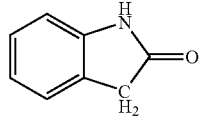

with a compound of formula

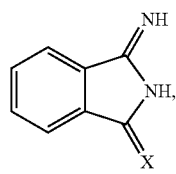

wherein
X is =NH or =O, to form a compound of formula

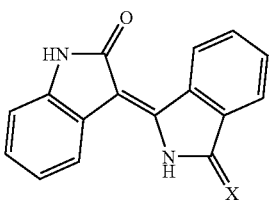

and optionally, when X is =NH, further reacting the compound of formula (52) with an active-methylene compound.

4. A method of producing coloured plastics or polymeric colour particles, which comprises mixing a plastic or polymeric material and a tinctorially effective amount of at least one pigment of formula (100) to (120) according to claim 1 with one another.

5. A method according to claim 4 wherein a plastic or polymeric material is polyester or polyamide.

6. Plastics or polymeric particles coloured with a pigment of formula (100) to (120) according to claim 1.

* * * * *